(12) United States Patent
Isobe

(10) Patent No.: US 11,981,073 B2
(45) Date of Patent: May 14, 2024

(54) METHOD FOR PRODUCING THREE-DIMENSIONAL MOLDED OBJECT, AND POWDER MATERIAL USED THEREIN

(71) Applicant: Konica Minolta, Inc., Tokyo (JP)

(72) Inventor: Kazuya Isobe, Tokyo (JP)

(73) Assignee: KONICA MINOLTA, INC., Tokyo (JP)

( * ) Notice: Subject to any disclaimer, the term of this patent is extended or adjusted under 35 U.S.C. 154(b) by 302 days.

(21) Appl. No.: 16/769,502

(22) PCT Filed: Dec. 6, 2018

(86) PCT No.: PCT/JP2018/044959
§ 371 (c)(1),
(2) Date: Jun. 3, 2020

(87) PCT Pub. No.: WO2019/117016
PCT Pub. Date: Jun. 20, 2019

(65) Prior Publication Data
US 2021/0187838 A1  Jun. 24, 2021

(30) Foreign Application Priority Data

Dec. 13, 2017  (JP) ................................. 2017-238751

(51) Int. Cl.
*B29C 64/00* (2017.01)
*B29C 64/112* (2017.01)
(Continued)

(52) U.S. Cl.
CPC .......... *B29C 64/165* (2017.08); *B29C 64/112* (2017.08); *B29C 64/264* (2017.08);
(Continued)

(58) Field of Classification Search
CPC ..... B29C 53/00; B29C 64/165; B29C 64/153; B29C 64/00; B33Y 10/00; C08L 2207/53
See application file for complete search history.

(56) References Cited

U.S. PATENT DOCUMENTS

| | | | |
|---|---|---|---|
| 9,382,420 B2* | 7/2016 | Diekmann | ............. C08J 7/0427 |
| 2015/0080495 A1* | 3/2015 | Heikkila | ............... B29C 64/106 |
| | | | 264/642 |
| 2016/0272844 A1* | 9/2016 | Osaka | ..................... C04B 35/64 |

FOREIGN PATENT DOCUMENTS

| | | |
|---|---|---|
| EP | 3385060 A | 10/2018 |
| JP | 2007-533480 A | 11/2007 |

(Continued)

OTHER PUBLICATIONS

Knovel Critical Tables (2nd Edition) (Year: 2008).*

(Continued)

*Primary Examiner* — Larry W Thrower
*Assistant Examiner* — John W Hatch
(74) *Attorney, Agent, or Firm* — LUCAS & MERCANTI, LLP

(57) ABSTRACT

The present invention addresses the problem of providing a powder material that has good wettability with respect to an aqueous solvent and that can be applied to a method for producing a three-dimensional molded object in which a bonding fluid and a peeling fluid are applied. In order to solve the abovementioned problem, a powder material according to the present invention is used in a method for a producing a three-dimensional molded object that includes formation of a thin layer containing the powder material, application of a bonding fluid containing an aqueous solvent and an energy-absorbing agent to the thin layer, and irradiation of the thin layer with energy. The powder material contains molding particles comprising: resin particles containing a thermoplastic resin; and an organic resin layer that (Continued)

is arranged around the resin particles and that contains an organic resin having a surface tension of 30-45 mN/m.

11 Claims, 2 Drawing Sheets

(51) Int. Cl.
| | |
|---|---|
| *B29C 64/165* | (2017.01) |
| *B29C 64/264* | (2017.01) |
| *B33Y 10/00* | (2015.01) |
| *B33Y 70/00* | (2020.01) |
| *C08L 23/12* | (2006.01) |
| *C08L 67/02* | (2006.01) |
| *B29K 77/00* | (2006.01) |
| *B33Y 70/10* | (2020.01) |

(52) U.S. Cl.
CPC ............... *B33Y 10/00* (2014.12); *B33Y 70/00* (2014.12); *C08L 23/12* (2013.01); *C08L 67/02* (2013.01); *B29K 2077/00* (2013.01); *B33Y 70/10* (2020.01); *C08L 2207/53* (2013.01)

(56) References Cited

FOREIGN PATENT DOCUMENTS

| | | |
|---|---|---|
| JP | 2016187918 A | 11/2016 |
| WO | 2016053305 A1 | 4/2016 |
| WO | 2017/094345 A1 | 6/2017 |
| WO | 2017/163834 A1 | 9/2017 |

OTHER PUBLICATIONS

JPO, Office Action for corresponding Japanese Application No. 2019-559593, dated Apr. 5, 2022, with English translation.
PCT, International Search Report for the corresponding application No. PCT/JP2018/044959, dated Feb. 12, 2019. with English translation (4 pages).
EPO, Office Action for corresponding European Application No. 18888819.2, dated May 19, 2022.
Extended European Search Report for corresponding Application No. EP 18888819.2 dated Jan. 15, 2021 (7 pages).
Translation of Written Opinion of the International Searching Authority for corresponding Application No. PCT/JP2018/044959 dated Jun. 25, 2020 (7 pages).

\* cited by examiner

METHOD FOR PRODUCING THREE-DIMENSIONAL MOLDED OBJECT, AND POWDER MATERIAL USED THEREIN

CROSS REFERENCE TO RELATED APPLICATION

This Application is a 371 of PCT/JP2018/044959 filed on Dec. 6, 2018 which, in turn, claimed the priority of Japanese Patent Application No. 2017-238751 filed on Dec. 13, 2017, both applications are incorporated herein by reference.

TECHNICAL FIELD

The present invention relates to a method for producing a three-dimensional object, and a powder material used for the method.

BACKGROUND ART

In recent years, various methods that enable relatively easy production of three-dimensional objects having complex shapes have been developed. Rapid prototyping and rapid manufacturing using such methods have been attracting attention.

As one of such methods for producing three-dimensional objects, a method of forming a thin layer composed of a powder material including a thermoplastic resin, and sintering or fuse-bonding (hereafter, also simply referred to as "fuse-bonding") only the powder material in a desired region, to obtain a three-dimensional object has been proposed. For example, a method of performing various treatments such that a region in which a powder material is to be fuse-bonded (hereafter, also referred to as "curing region") and the other region (hereafter, also referred to as "non-curing region") become different from each other in the degree of energy absorption, and then irradiating the whole surface of the thin layer with energy has been proposed (Patent Literature 1). This method enables consolidation of irradiations with energy, so that three-dimensional objects can be formed much faster than in the existing methods, which is advantageous. Incidentally, the following Patent Literature 1 describes, as the method of providing the curing region so as to have a degree of energy absorption higher than the degree of energy absorption of the non-curing region, coating only the curing region with an energy absorbent.

CITATION LIST

Patent Literature

PTL 1: Japanese Unexamined Patent Application Publication (Translation of PCT Application) No. 2007-533480

SUMMARY OF INVENTION

Technical Problem

In recent years, in the method for producing a three-dimensional object in PTL 1 above, coating the curing region with a bonding fluid including an energy absorbent and optionally coating the non-curing region with a release fluid having low energy absorption have been studied (hereafter, this mode is also referred to as "MJF mode"). In the MJF mode, after coating with the bonding fluid and optionally the release fluid, the whole surface is irradiated with energy, so that the energy absorbent in the curing region absorbs the energy to generate heat. This increases the temperature of the powder material in the curing region, so that the powder material is fuse-bonded together.

In this MJF mode, in general, the bonding fluid and the release fluid employed include an aqueous solvent, and, in general, the powder material having been employed is resin particles including polyamide 12, for example. Polyamide 12 has appropriate wettability for the bonding fluid and the release fluid, and can be suitably used for the MJF mode. On the other hand, in recent years, there has also been a demand for use of resins other than polyamide 12 for producing three-dimensional objects. Among resins, there are a large number of resins not having sufficient wettability for aqueous solvents. When such a resin having low wettability is used for the MJF mode, upon coating with the bonding fluid and the release fluid, the bonding fluid and the like do not sufficiently spread, so that, in the curing region, the energy absorbent tends to have unevenness in the concentration. As a result, upon irradiation with energy, unevenness in the temperature in the curing region occurs, so that the obtained three-dimensional object tends to have low strength. On the other hand, in the case of resins having excessively high wettability for aqueous solvents, the bonding fluid and the like spread excessively, which tends to result in low dimensional accuracy. In summary, in the case of applying existing powder materials to the MJF mode, usable resins tend to be limited; in order to use a desired resin, the bonding fluid and the release fluid need to be changed in accordance with the species of the resin.

The present invention has been made in consideration of the above-described problem. Specifically, the present invention provides a powder material that has high wettability for an aqueous solvent and that is applicable to a method for producing a three-dimensional object including coating with a bonding fluid and a release fluid, and a method for producing a three-dimensional object, the method using the powder material.

Solution to Problem

A first aspect of the present invention is as follows:

[1] A powder material used for a method for producing a three-dimensional object, the method including forming a thin layer including the powder material, coating the thin layer with a bonding fluid including an aqueous solvent and an energy absorbent, and irradiating the thin layer with energy, the powder material comprising:

an object-forming particle including a resin particle including a thermoplastic resin, and an organic resin layer disposed around the resin particle and including an organic resin having a surface tension of 30 mN/m to 45 mN/m.

[2] The powder material according to [1], wherein, in the object-forming particle, the organic resin layer covers 40% or more and 100% or less of a surface area of the resin particle.

[3] The powder material according to [1] or [2], wherein the organic resin has a glass transition temperature or melting point of 100° C. or more and 230° C. or less.

A second aspect of the present invention is as follows:

[4] A method for producing a three-dimensional object, the method comprising:
    forming a thin layer including the powder material according to any one of [1] to [3];
    coating a specific region of the thin layer with a bonding fluid including an aqueous solvent and an energy absorbent; and
    irradiating, with energy, the thin layer after the coating to fuse the resin particle in the object-forming particle in the region coated with the bonding fluid to form an object layer.

[5] The method for producing a three-dimensional object according to [4], wherein the forming, the coating, and the irradiating are repeated a plurality of times to stack the object layer, to form a three-dimensional object.

[6] The method for producing a three-dimensional object according to [4] or [5], wherein, in the coating, a region adjacent to the region coated with the bonding fluid is coated with a release fluid that absorbs less energy than the bonding fluid.

[7] The method for producing a three-dimensional object according to [6], wherein, in the coating, coating with the bonding fluid and the release fluid is performed by an inkjet process.

[8] The method for producing a three-dimensional object according to any one of [5] to [7], wherein the energy absorbent is an infrared absorbent, and, in the irradiating, irradiation with infrared light is performed.

Advantageous Effects of Invention

The powder material according to the present invention has high wettability for the bonding fluid and the release fluid used for coating during production of the three-dimensional object. Thus, the powder material provides a three-dimensional object having high dimensional accuracy and high strength. The powder material may include any resin such as a resin having excessively high wettability for or a resin having excessively low wettability for the aqueous solvent. Thus, various needs of users can be met.

DESCRIPTION OF EMBODIMENTS

Figure 1:
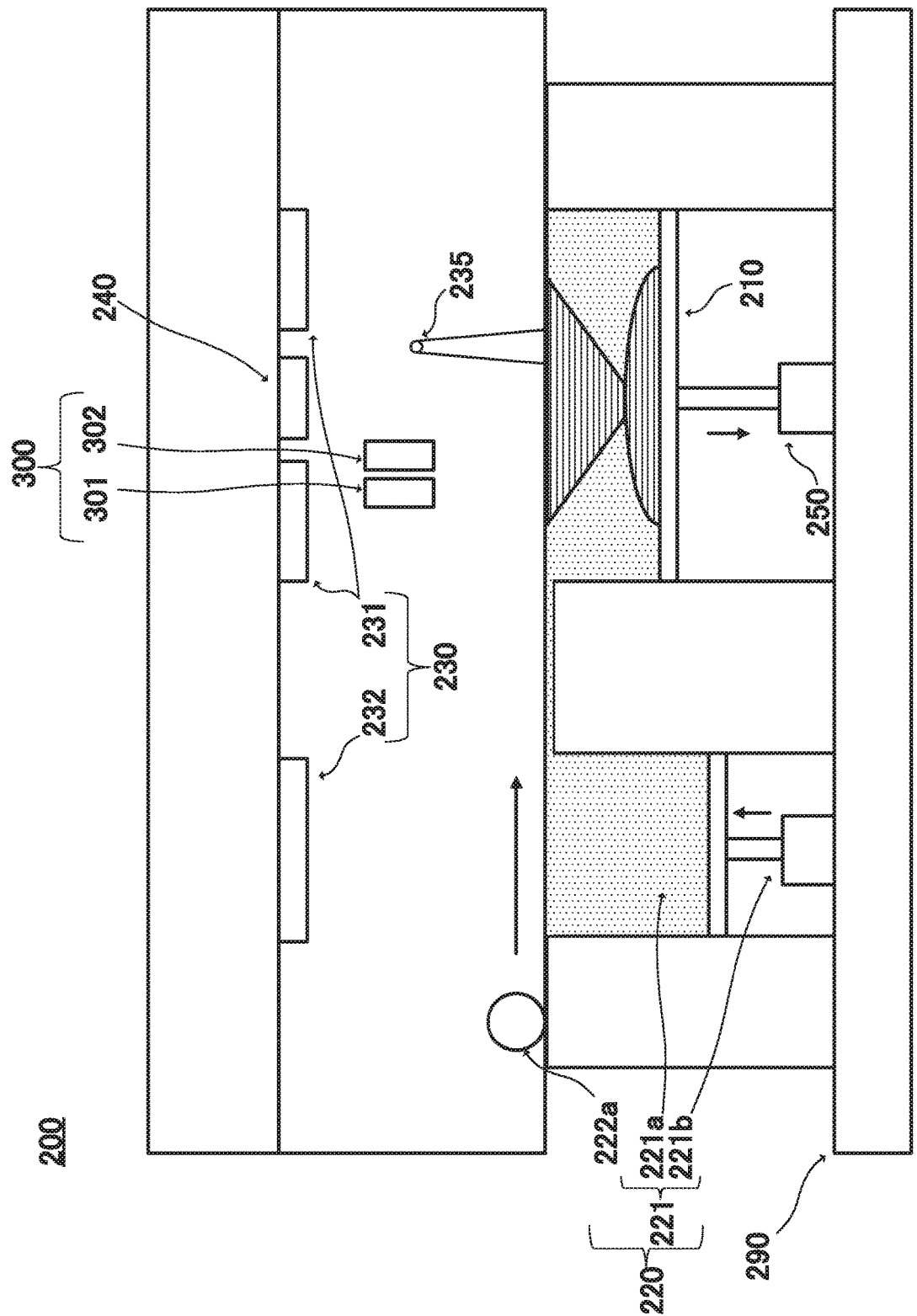
FIG. 1 is a schematic side view illustrating the configuration of a three-dimensional object-forming apparatus according to an embodiment of the present invention.

The powder material according to the present invention is a material applied to the above-described MJF mode. As described above, in the general MJF method, for the bonding fluid and the release fluid, aqueous solvents are employed. Thus, resins having excessively low wettability for and resins having excessively high wettability for aqueous solvents have been difficult to use for powder materials; when such powder materials are used, the resultant three-dimensional objects tend to have lower dimensional accuracy or lower strength, which has been problematic.

By contrast, in an object-forming particle included in the powder material according to the present invention, an organic resin layer including an organic resin having a surface tension of 30 mN/m to 45 mN/m is disposed around a resin particle including a thermoplastic resin. In the powder material, upon coating with the curing region and the release fluid, the bonding fluid and the release fluid appropriately spread along such organic resin layers. Thus, as the thermoplastic resin constituting such resin particles, resins having excessively low wettability for aqueous solvents and resins having excessively high wettability for aqueous solvents can be employed. In addition, since the organic resin has a surface tension in the above-described range, the bonding fluid appropriately spreads, so that the energy absorbent can be evenly distributed in the curing region alone. As a result, in the curing region, the resin particles can be evenly fuse-bonded together. In summary, use of the powder material according to the present invention provides a much wider choice of resins and further provides a three-dimensional object having high strength and high object-forming accuracy. Hereinafter, the powder material will be first described, which will be followed by the method for producing a three-dimensional object using the powder material.

1. Regarding Powder Material

The powder material according to the present invention at least includes object-forming particles. The powder material may include, for example, various additives, a flow agent, and a filler as needed.

The object-forming particles include resin particles including a thermoplastic resin, and organic resin layers disposed around the resin particles and including an organic resin having a surface tension of 30 mN/m to 45 mN/m. The shape of such an object-forming particle is not particularly limited and may be any shape such as a spherical shape or a prismatic shape; the shape is preferably a spherical shape from the viewpoint of providing a powder material having high flow ability and producing a three-dimensional object at high dimensional accuracy.

The average particle size of the object-forming particles is not particularly limited, and is preferably 2 µm or more and 210 µm or less, more preferably 10 µm or more and 80 µm or less. When the object-forming particles have an average particle size of 2 µm or more, the method for producing a three-dimensional object described later tends to provide an object layer having a sufficiently large thickness, so that the three-dimensional object can be produced efficiently. On the other hand, when the object-forming particles have an average particle size of 210 µm or less, even three-dimensional objects having complex shapes can be produced.

The average particle size of the object-forming particles is a volume-average particle size measured by a dynamic light scattering method. The volume-average particle size can be measured using a laser-diffraction-type particle-size-distribution measurement apparatus equipped with a wet dispersion device (manufactured by MicrotracBEL Corp., MT3300EX II).

In the object-forming particles, the organic resin layers may cover the entirety of or only portions of the outer peripheries of the resin particles. The organic resin layers may be sheet-like or may be aggregates of fine particles. Specifically, sheet-like organic resin layers may cover the surfaces of the resin particles, or particles including the organic resin may cover the surfaces of the resin particles. Incidentally, the organic resin layers are preferably sheet-like from the viewpoint that they cause the bonding fluid and the release fluid to sufficiently spread.

From the viewpoint of providing sufficient and appropriate wettability for the bonding fluid and the release fluid, the organic resin layers preferably cover 40% or more of, more preferably 45% or more of the surface area of the resin particles. The upper limit is 100%. Also in the cases of 90% or less, the advantage is sufficiently provided. When the organic resin layers are made to cover less than 100% of the area of the resin particles, during fuse-bonding of the object-forming particles, the thermoplastic resin derived from the inner resin particles tends to seep out to the surfaces, to facilitate bonding between the object-forming particles, which is advantageous. The percentage of the surface area of the resin particles covered by the organic resin layers is calculated in the following manner. A sectional image of a large number of object-forming particles is first captured with a transmission electron microscope (TEM); 10 object-forming particles are randomly selected, and the surface area of each resin particle and the area covered by the organic resin layer are determined. The percentages of being covered by the organic resin layers are individually calculated for the particles, and are averaged to thereby achieve the determination.

The thickness of the organic resin layers is not particularly limited, and is ordinarily preferably 15 to 500 n, more preferably 15 to 400 nm, still more preferably 20 to 300 n. When the organic resin layers have an excessively large thickness, the organic resin layers may inhibit fuse-bonding of the resin particles. When the thickness is 500 nm or less, the resin particles can be sufficiently fuse-bonded together. When the organic resin layers have a thickness of 15 nm or more, the resin particles tend to be sufficiently covered by the organic resin layers. The thickness of the organic resin layers is determined in the following manner: a sectional image of a large number of object-forming particles is captured with a transmission electron microscope (TEM), 10 object-forming particles are randomly selected, and the average of the thicknesses of the organic resin layers is determined.

The organic resin layers may include only the organic resin having a surface tension of 30 mN/m to 45 mN/m, or may include, in addition to this organic resin, another material. The organic resin having a surface tension of 30 mN/m to 45 mN/m is preferably included such that the organic resin layers have a surface tension of 30 mN/m to 45 mN/m, more preferably 35 to 40 mN/m. Specifically, relative to the total amount of the organic resin layers, the content of the organic resin having a surface tension of 30 mN/m to 45 mN/m is preferably 60 mass % or more, more preferably 70 mass % or more, still more preferably 80 mass %. Incidentally, the surface tension is determined by measuring the surface tension in the fused state using a pendant-drop-type interface tensiometer DSA25/DSA manufactured by KRUSS GmbH, and by extrapolating this surface tension to the surface tension at 20° C.

Specific examples of the organic resin having the surface tension include polyamide 12, polyamide 6, polycarbonate, polyoxymethylene, polymethyl methacrylate, polyethylene, polystyrene, polyvinyl chloride, and polyvinyl alcohol. The organic resin layers may include one of these alone or two or more of these. Of these, in particular, polyamide 12 and polyamide 6 are preferred.

The organic resin having a surface tension of 30 mN/m to 45 mN/m preferably has a glass transition temperature or melting point of 100° C. or more and 230° C. or less, more preferably 120 to 230° C. When the organic resin having a surface tension of 30 mN/m to 45 mN/m has an excessively low glass transition temperature or melting point, during production of the three-dimensional object (for example, during preliminary heating), the organic resin layers may soften or fuse, so that the object-forming particles may be bonded together. Specifically, even in the non-curing region, the object-forming particles are bonded together, so that the resultant three-dimensional object tends to have lower object-forming accuracy. By contrast, when the organic resin has a glass transition temperature or melting point of 100° C. or more, during production of the three-dimensional object, the organic resin layers are less likely to soften or fuse, so that the three-dimensional object can be produced at high dimensional accuracy. On the other hand, when the organic resin has an excessively high glass transition temperature or melting point, during production of the three-dimensional object, irradiation with a large amount of energy is necessary. In the case of a glass transition temperature or melting point of 230° C. or less, the object-forming particles in the curing region can be efficiently bonded together.

As described above, the organic resin layers may include a component other than the organic resin as long as an object and advantages of the present invention are not hindered. Examples of the component other than the organic resin include publicly known additives and publicly known body pigments.

On the other hand, the resin particles included in the object-forming particles are particles that at least include a thermoplastic resin, and may include a component other than the thermoplastic resin. The content of the thermoplastic resin relative to the mass of the resin particles is preferably 40 mass % or more, more preferably 50 mass % or more, still more preferably 60 mass % or more. When the content of the thermoplastic resin is 40 mass % or more, the resultant three-dimensional object has higher strength.

The shape of such a resin particle is not particularly limited, and may have any shape such as a spherical shape or a prismatic shape; the shape is preferably a spherical shape from the viewpoint of providing a powder material having high flow ability and producing a three-dimensional object at high dimensional accuracy. The average particle size is preferably 1 μm or more and 200 m or less, more preferably 2 μm or more and 150 μm or less, still more preferably 5 μm or more and 100 μm or less, still more preferably 5 μm or more and 70 μm or less, still more preferably 10 μm or more and 60 μm or less. When the resin particles have an average particle size of 1 μm or more, the object-forming particles have an average particle size in an appropriate range, so that sufficient flow ability can be imparted to the powder material. When the average particle size is 1 μm or more, the resin particles are easily produced, so that the production costs of the powder material do not increase, which is also advantageous. On the other hand, when the average particle size is 200 μm or less, the object-forming particles can be formed so as to have an average particle size in a desired range, so that a high-precision three-dimensional object can be produced.

The thermoplastic resin included in the resin particles is not particularly limited as long as it is a resin that is fusible upon heating by the energy absorbent generating heat under irradiation with energy. The species of the thermoplastic resin is appropriately selected in accordance with, for example, the application of the three-dimensional object. The object-forming particles may include a single thermoplastic resin alone or may include two or more thermoplastic resins. Incidentally, when the thermoplastic resin constituting the resin particles is a resin having appropriate wettability for the aqueous solvent, even in the absence of the organic resin layers, high wettability for the bonding fluid and the release fluid can be provided. Thus, from the viewpoint of sufficiently providing advantages of the present invention, the thermoplastic resin constituting the resin particles is preferably a material having an excessively low or high wettability for the aqueous solvent, specifically, preferably a resin having a surface tension of more than 45 mN/m or a resin having a surface tension of less than 30 mN/N.

When the thermoplastic resin has an excessively high fusing temperature, during production of the three-dimensional object, a large amount of energy is necessary in order to fuse the thermoplastic resin. Thus, the fusing temperature of the thermoplastic resin is preferably 300° C. or less, more preferably 230° C. or less. On the other hand, from the viewpoint of, for example, the heat resistance of the resultant three-dimensional object, the thermoplastic resin preferably has a fusing temperature of 100° C. or more, more preferably 120° C. or more. The fusing temperature can be adjusted by changing, for example, the species of the thermoplastic resin.

Examples of the thermoplastic resin include polybutylene terephthalate, polypropylene, polysulfone, polyacrylonitrile, and poly 2-ethylhexyl methacrylate.

As described above, the resin particles may include a component other than the thermoplastic resin as long as an object and advantages of the present invention are not hindered. Examples of the component other than the thermoplastic resin include publicly known additives and publicly known body pigments. For example, an inorganic material may be included. The shape of the inorganic material is not particularly limited, and may be, for example, a spherical shape, a polygonal prismatic shape, or a flaky shape. The average particle size may be about 0.01 to about 50 μm. The average particle size of the inorganic material is a volume-average particle size, and can be determined by removing, using, for example, a solvent, the thermoplastic resin in the resin particles and the organic resin layers, and by subsequently measuring the volume-average particle size using the laser-diffraction-type particle-size-distribution measurement apparatus, for example.

The material constituting the inorganic material is not particularly limited, and examples thereof include metal oxides such as aluminum oxide, magnesium oxide, and talc; and semimetal or metal carbides or nitrides such as silicon carbide, boron nitride, and aluminum nitride. The object-forming particles may include a single inorganic material alone or may include two or more inorganic materials.

The powder material may include a component other than the object-forming particles as long as an object and advantages of the present invention are not hindered, for example, various additives. Examples of the various additives include antioxidants, acidic compounds and derivatives thereof, lubricants, ultraviolet absorbents, light stabilizers, nucleating agents, flame retardants, impact modifiers, blowing agents, coloring agents, organic peroxides, spreaders, and adhesives. The powder material may include one of these alone, or may include two or more of these.

The powder material may include a filler as long as an object and advantages of the present invention are not hindered. Examples of the filler include inorganic fillers such as talc, calcium carbonate, zinc carbonate, wollastonite, silica, alumina, magnesium oxide, calcium silicate, sodium aluminate, calcium aluminate, sodium aluminosilicate, magnesium silicate, glass balloons, glass cut fiber, glass milled fiber, glass flake, glass powder, silicon carbide, silicon nitride, gypsum, gypsum whisker, calcined kaolin, carbon black, zinc oxide, antimony trioxide, zeolite, hydrotalcite, metallic fiber, metallic whisker, metallic powder, ceramic whisker, potassium titanate, boron nitride, graphite, and carbon fiber; nanofibers of polysaccharides; and various polymers. The powder material may include one of these alone, or may include two or more of these.

The powder material may include a flow agent as long as an object and advantages of the present invention are not hindered. The flow agent is a material that at least has a low friction coefficient and self-lubricity. Examples of the flow agent include silicon dioxide and boron nitride. These flow agents may be included alone or may be both included. The amount of flow agent can be appropriately set as long as the powder material has improved flow ability and the powder material is sufficiently fuse-bonded; for example, the amount relative to the total mass of the powder material may be more than 0 mass % and less than 2 mass %.

The method for preparing the powder material is not particularly limited, and may be, for example, the following method. Resin particles composed of a thermoplastic resin are first prepared. Alternatively, the resin particles may be produced by preparing and pulverizing a thermoplastic resin. Alternatively, a commercially available product may be employed. In order to provide the resin particles so as to uniformly have an average particle size, for example, mechanical pulverization or classification may be performed as needed. When the resin particles include an inorganic material, they can be prepared by heat-mixing the thermoplastic resin and inorganic particles, and then pulverizing the mixture so as to have a desired size.

Around the resin particles, the organic resin layers are formed. The process of forming the organic resin layers may be a publicly known process. Examples of the process include a wet coating process of coating the resin particles with a coating solution in which the organic resin is dissolved, a dry coating process of stirring and mixing the resin particles, particles composed of the organic resin, and the like to achieve bonding together by mechanical impact, and a process of a combination of these processes. In the case of employing the wet coating process, the surfaces of the resin particles may be subjected to spray coating using the coating solution, or the resin particles may be immersed in the coating solution. The wet coating process enables formation of sheet-like organic resin layers. On the other hand, the dry coating process can provide organic resin layers that are aggregates of a particulate organic resin.

2. Method for Producing Three-Dimensional Object

Hereinafter, a method for producing a three-dimensional object using the above-described powder material will be described. In this method for producing a three-dimensional object, the following are at least performed: (1) a thin layer formation step of forming a thin layer including the above-described powder material, (2) a fluid coating step of coating a specific region of the thin layer with a bonding fluid including an energy absorbent and an aqueous solvent, and (3) an energy irradiation step of irradiating, with energy, the thin layer after the fluid coating step, to fuse the thermoplastic resin in the object-forming particles in the region coated with the bonding fluid, to form an object layer. In the fluid coating step, a region adjacent to the region coated with the bonding fluid may be coated with a release fluid that absorbs less energy than the bonding fluid.

As described above, the powder material has appropriate wettability for aqueous solvents included in the bonding fluid and the release fluid. Thus, in the fluid coating step, the bonding fluid and the release fluid can be evenly spread in the desired regions alone. As a result, irradiation with energy in the energy irradiation step causes efficient and even curing only in the region coated with the bonding fluid, to provide a three-dimensional object having high dimensional accuracy and high strength. Hereinafter, the method for producing this three-dimensional object will be described in detail.

(1) Thin Layer Formation Step

In the thin layer formation step, a thin layer mainly including the above-described powder material is formed. The process of forming the thin layer is not particularly limited as long as a layer having a desired thickness can be formed. For example, this step can be a step of, using a recoater, spreading, flatly over an object-forming stage, the powder material supplied from a powder supply section of a three-dimensional object-forming apparatus. The thin layer may be formed directly on the object-forming stage, or may be formed on and in contact with a powder material having been spread or an object layer having been formed.

The thickness of the thin layer is set to be the same as the thickness of the object layer to be formed. The thickness of the thin layer can be freely set in accordance with the accuracy of the three-dimensional object to be produced, and is ordinarily 0.01 mm or more and 0.30 mm or less. When the thickness of the thin layer is set to be 0.01 mm or more, an object layer having been formed can be prevented from being fused by irradiation with energy for forming a new object layer (irradiation with energy in the energy irradiation step described later). When the thickness of the thin layer is 0.01 mm or more, the powder material can be easily spread evenly. When the thickness of the thin layer is set to be 0.30 mm or less, in the energy irradiation step described later, the irradiation can cause energy (such as infrared light) to reach even a lower portion of the thin layer. This enables fusing of the entirety of, in the thickness direction, the thermoplastic resin in the curing region (region coated with a bonding fluid). From such a viewpoint, the thin layer more preferably has a thickness of 0.01 mm or more and 0.20 mm or less.

After the thin layer is formed or before the thin layer is formed, preliminary heating may be performed as needed. When the preliminary heating is performed, a reduction in the amount of energy for irradiation can be achieved in the energy irradiation step described later. In addition, an object layer can be formed efficiently in a short time. The temperature of the preliminary heating is a temperature lower than the fusing temperature of the thermoplastic resin (resin particles) included in the thin layer, and is preferably a temperature lower than the boiling points of the aqueous solvents included in the bonding fluid and the release fluid used for coating in the fluid coating step described later. Specifically, when, of the melting point of the thermoplastic resin and the boiling points of the aqueous solvents included in the bonding fluid and the release fluid, the lowest temperature is denoted by T(° C.), preferred is (T−50°) C or more and (T−5°) C or less, more preferred is (T−30°) C or more and (T−5°) C or less. In this case, the heating time is preferably 1 to 60 seconds, more preferably 3 to 20 seconds. When the heating temperature and the heating time are set to satisfy such ranges, a reduction in the energy irradiation dose can be achieved in the energy irradiation step.

(2) Fluid Coating Step

In the fluid coating step, in the thin layer formed in the thin layer formation step, a specific region is coated with a bonding fluid. In addition, as described above, a region adjacent to the region coated with the bonding fluid may be coated with a release fluid. Specifically, a region in which an object layer is to be formed (curing region) is selectively coated with the bonding fluid while a region in which the object layer is not to be formed (non-curing region) may be coated with the release fluid. The order of performing coating with the bonding fluid and coating with the release fluid is not limited. Preferably, coating with the bonding fluid is first performed from the viewpoint of the dimensional accuracy of the resultant three-dimensional object.

The process of coating with the bonding fluid and the release fluid is not particularly limited. Examples of the coating process include coating using a dispenser, coating by an inkjet process, and spray coating. From the viewpoint that desired regions can be coated at a high speed with the bonding fluid and the release fluid, at least one of these is preferably used for coating by an inkjet process, both of these are more preferably used for coating by an inkjet process.

The coating amount of each of the bonding fluid and the release fluid relative to 1 $mm^3$ of the thin layer is preferably 0.1 to 50 µL, more preferably 0.2 to 40 µL. When the coating amounts of the bonding fluid and the release fluid satisfy such a range, the powder materials of the curing region and the non-curing region can be sufficiently impregnated with the bonding fluid and the release fluid, respectively. This results in formation of a three-dimensional object having high dimensional accuracy.

The bonding fluid used for coating in this step at least includes an energy absorbent and an aqueous solvent. The bonding fluid may further include, for example, a publicly known dispersant, as needed.

The energy absorbent is not particularly limited as long as it absorbs energy provided by irradiation in the energy irradiation step described later, to efficiently increase the temperature of the region coated with the bonding fluid. Specific examples of the energy absorbent include infrared absorbents such as carbon black, ITO (indium tin oxide), and ATO (antimony tin oxide); and infrared absorbing pigments such as cyanine pigments; phthalocyanine pigments having aluminum or zinc at the center; various naphthalocyanine compounds; nickel dithiolene complexes having a four-coordinated planar structure; squarylium pigments; quinone-based compounds; diimmonium compounds; and azo compounds. Of these, from the viewpoint of versatility and enabling an efficient increase in the temperature of the region coated with the bonding fluid, preferred are infrared absorbents, more preferred is carbon black.

The shape of the energy absorbent is not particularly limited, and is preferably a particulate shape. The average particle size is preferably 0.1 to 1.0 µm, more preferably 0.1 to 0.5 µm. When the energy absorbent has an excessively large average particle size, during coating of the thin layer with the bonding fluid, the energy absorbent is less likely to enter gaps between the object-forming particles. By contrast, when the average particle size is 1.0 µm or less, the energy absorbent is likely to enter the gaps between the object-forming particles. On the other hand, when the energy absorbent has an average particle size of 0.1 µm or more, in the energy irradiation step described later, heat can be efficiently conducted to the object-forming particles (in particular, the thermoplastic resin in the resin particles), to thereby fuse-bond the object-forming particles together.

In the bonding fluid, the content of the energy absorbent is preferably 0.1 to 10.0 mass %, more preferably 1.0 to 5.0 mass %. When the content of the energy absorbent is 0.1 mass % or more, in the energy irradiation step described later, the temperature of the region coated with the bonding fluid can be sufficiently increased. On the other hand, when the content of the energy absorbent is 10.0 mass % or less, for example, the energy absorbent is less likely to aggregate within the bonding fluid, which tends to result in higher coating stability of the bonding fluid.

On the other hand, the aqueous solvent is not particularly limited as long as it is an aqueous solvent in which the energy absorbent is dispersible and components in the object-forming particles are less likely to dissolve. In this Description, the "aqueous solvent" means water or an organic solvent miscible with water. Examples of the organic solvent miscible with water include alcohol-based solvents such as methanol, ethanol, propanol, isopropyl alcohol, and triethylene glycol; nitrile alcohol-based solvents such as acetonitrile; ketone alcohol-based solvents such as acetone; ether alcohol-based solvents such as 1,4-dioxane and tetrahydrofuran (THF); and amide alcohol-based solvents such as dimethylformamide (DMF). The bonding fluid may include one of these alone or two or more of these. Of these, particularly preferred is a mixed solution of water and triethylene glycol.

In the bonding fluid, the content of the aqueous solvent is preferably 90.0 to 99.9 mass %, more preferably 95.0 to 99.0 mass %. When the content of the aqueous solvent in the bonding fluid is 90.0 mass % or more, the bonding fluid has high flow ability, and is easily used for coating by an inkjet process, for example.

The bonding fluid preferably has a viscosity of 0.5 to 50.0 mPa-s, more preferably 1.0 to 20.0 mPa-s. When the bonding fluid has a viscosity of 0.5 mPa-s or more, diffusion of the bonding fluid upon coating of the thin layer tends to be appropriately suppressed. On the other hand, when the bonding fluid has a viscosity of 50.0 mPa-s or less, the bonding fluid tends to have higher coating stability.

On the other hand, the release fluid used for coating in this step is a fluid that absorbs less energy than the bonding fluid, and may be, for example, a fluid including an aqueous solvent as a main component. The release fluid may include a single aqueous solvent alone, or may include two or more aqueous solvents. The release fluid is particularly preferably a mixed solution of water and triethylene glycol.

In the release fluid, the content of the aqueous solvent is preferably 90 mass % or more, more preferably 95 mass % or more. When the release fluid has an aqueous solvent content of 90 mass % or more, it is easily used for coating by an inkjet process, for example.

The release fluid preferably has a viscosity of 0.5 to 50.0 mPa-s, more preferably 1.0 to 20.0 mPa-s. When the release fluid has a viscosity of 0.5 mPa-s or more, diffusion of the release fluid upon coating of the thin layer tends to be appropriately suppressed. On the other hand, when the release fluid has a viscosity of 50.0 mPa-s or less, the release fluid tends to have higher coating stability.

(3) Energy Irradiation Step

In the energy irradiation step, the thin layer after the fluid coating step, that is, the thin layer having been coated with the bonding fluid and the release fluid is irradiated with energy collectively. At this time, in the region coated with the bonding fluid, the energy absorbent absorbs energy, so that the temperature of the region selectively increases. Thus, the thermoplastic resin in the resin particles in the region is fused to form an object layer.

The species of energy in the irradiation of this step is appropriately selected in accordance with the species of the energy absorbent included in the bonding fluid. Specific examples of the energy include infrared light and white light. In particular, from the viewpoint that, in the region coated with the release fluid, the temperature of the thin layer is less likely to increase, preferred is infrared light, more preferred is light at a wavelength of 780 to 3000 n, more preferred is light at a wavelength of 800 to 2500 nm.

The time for the irradiation with energy in this step is appropriately selected in accordance with the species of the resin particles (thermoplastic resin) included in the powder material. The time is ordinarily preferably 5 to 60 seconds, more preferably 10 to 30 seconds. When the energy irradiation time is set to be 5 seconds or more, the thermoplastic resin can be sufficiently fused and bonded together. On the other hand, when the energy irradiation time is set to be 60 seconds or less, the three-dimensional object can be efficiently produced.

3. Three-Dimensional Object-Forming Apparatus

A three-dimensional object-forming apparatus usable for the above-described method for producing a three-dimensional object will be described. The three-dimensional object-forming apparatus can have the same configuration as in publicly known three-dimensional object-forming apparatuses. A case of employing, as the energy for irradiation, infrared light will be described below as an example. The energy is not limited to infrared light.

As illustrated in the schematic side view of FIG. 1, three-dimensional object-forming apparatus 200 includes object-forming stage 210 positioned in an opening, thin layer-forming section 220 for forming a thin layer composed of the powder material, preliminary heating section 230 for subjecting the thin layer to preliminary heating, fluid-coating section 300 for coating the thin layer with the bonding fluid and the release fluid, infrared light irradiation section 240 for irradiating the thin layer with infrared light, stage support section 250 supporting object-forming stage 210 such that its position in the vertical direction is changeable, and base 290 supporting the foregoing sections.

Figure 2:
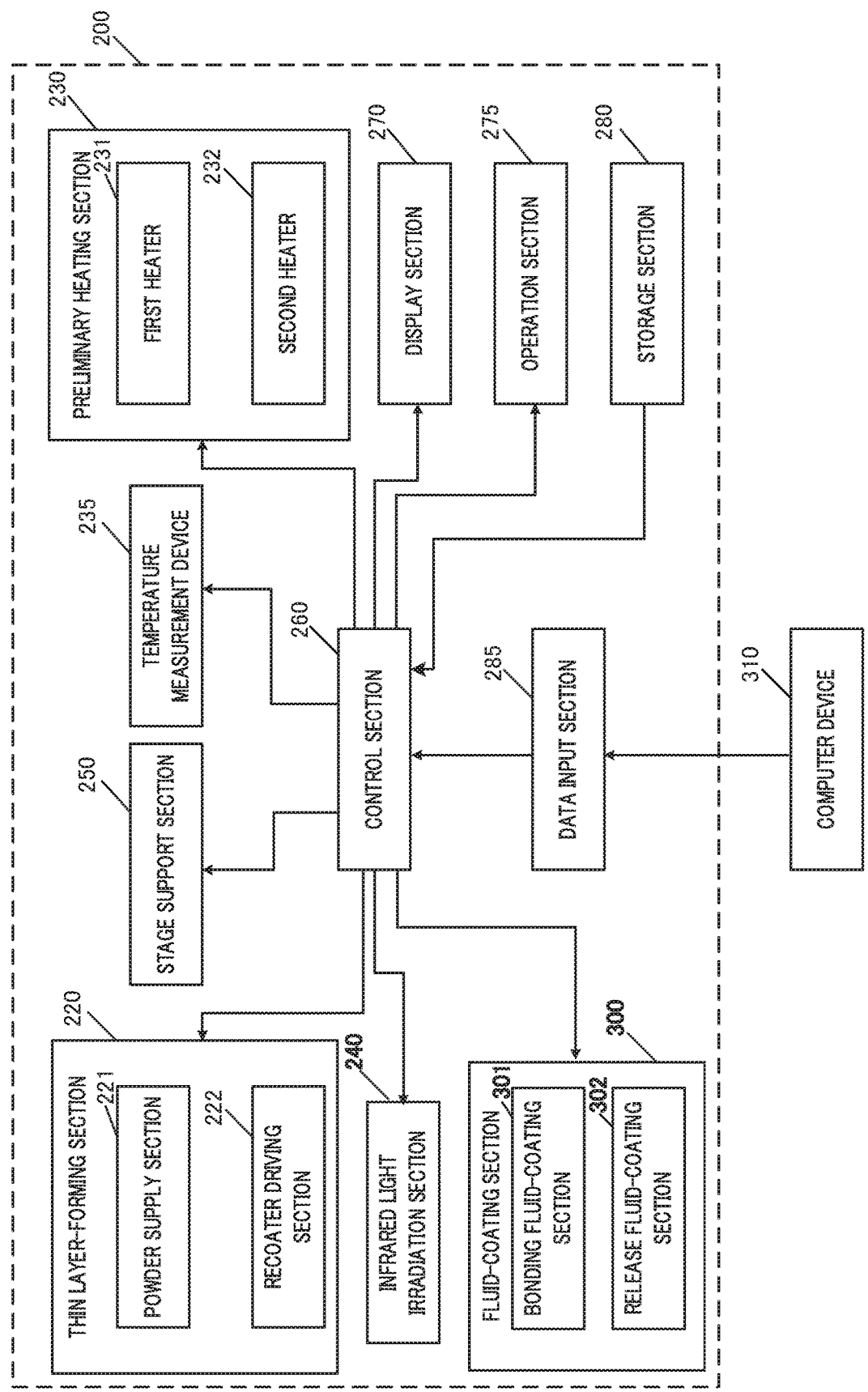
FIG. 2 illustrates main sections of the control system of a three-dimensional object-forming apparatus according to an embodiment of the present invention.

On the other hand, main sections of the control system of three-dimensional object-forming apparatus 200 are illustrated in FIG. 2. As illustrated in FIG. 2, three-dimensional object-forming apparatus 200 may include control section 260 that controls thin layer-forming section 220, preliminary heating section 230, fluid-coating section 300, infrared light irradiation section 240, and stage support section 250 so as to form and stack objects, display section 270 for displaying various data, operation section 275 including, for example, a pointing device for receiving instructions from the user, storage section 280 that stores various data including a control program executed by control section 260, and data input section 285 including, for example, an interface for sending to and receiving from an external device, various data such as three-dimensional object-forming data. Three-dimensional object-forming apparatus 200 may further include temperature measurement device 235 for measuring the surface temperature of the thin layer formed on object-forming stage 210. To three-dimensional object-forming apparatus 200, computer device 310 for creating three-dimensional object-forming data may be connected.

Object-forming stage 210 is controlled so as to be movable upward or downward. On object-forming stage 210, the following are performed: formation of the thin layer by thin layer-forming section 220, preliminary heating of the thin layer by preliminary heating section 230, coating with the bonding fluid and the release fluid by fluid-coating section 300, and irradiation with infrared light by infrared light irradiation section 240. Subsequently, objects formed by these are stacked, to form a three-dimensional object.

Thin layer-forming section 220 can have a configuration including powder supply section 221 including powder material-containing section 221a containing the powder material and supply piston 221b that is disposed at the bottom portion of powder material-containing section 221a and that moves upward or downward in the opening, and recoater 222a that flatly spread, over object-forming stage 210, the powder material supplied from powder supply section 221, to form a thin layer of the powder material. In this apparatus, the upper surface of the opening of powder material-containing section 221a is disposed so as to be substantially coplanar with the upper surface of the opening (for forming a three-dimensional object) in which object-forming stage 210 is moved upward or downward.

Incidentally, powder supply section 221 may have a configuration including a powder material-containing section (not shown) disposed, in the vertical direction, above object-forming stage 210, and a nozzle (not shown) for ejecting, in portions of a desired amount, the powder material contained in the powder material-containing section. In this case, the powder material is ejected, from the nozzle, evenly over object-forming stage 210, to thereby form a thin layer.

Preliminary heating section 230 at least heats, of the surface of the thin layer, a region in which an object layer is to be formed, and maintains the temperature. In the apparatus, preliminary heating section 230 includes first heater 231 that can heat the surface of the thin layer formed on the object-forming stage 210, and second heater 232 that heats the powder material to be supplied onto the object-forming stage. Alternatively, one of these heaters alone may be provided. Preliminary heating section 230 may be configured to selectively heat the region in which the object layer is to be formed, or may be configured to preliminarily heat the whole interior of the apparatus, and to adjust the temperature of the surface of the thin layer to a predetermined temperature.

Temperature measurement device 235 at least measures, in non-contact manner, the surface temperature of the thin layer, in particular, the surface temperature of the region in which the object layer is to be formed. For example, an infrared sensor or an optical pyrometer may be employed.

Fluid-coating section 300 includes bonding fluid-coating section 301 and release fluid-coating section 302. Incidentally, in the case of not performing coating with the release fluid, release fluid-coating section 302 may not be disposed. Bonding fluid-coating section 301 and release fluid-coating section 302 may include storage sections (not shown) for individually storing the bonding fluid and the release fluid, and inkjet nozzles (not shown) connected to the storage sections.

Infrared light irradiation section 240 may have a configuration including an infrared lamp. The infrared lamp is a light source that is at least configured to radiate infrared light at a desired timing.

Stage support section 250 at least supports object-forming stage 210 such that its position in the vertical direction is changeable. Specifically, object-forming stage 210 is configured to be moved accurately in the vertical direction by stage support section 250. Stage support section 250 may employ various configurations, and may be constituted by, for example, a holding member holding object-forming stage 210, a guide member that guides this holding member in the vertical direction, and a ball screw mated to a threaded hole formed in the guide member.

Control section 260 includes a hardware processor such as a central processing unit, and controls, during operations for forming a three-dimensional object, the whole operations of three-dimensional object-forming apparatus 200.

Control section 260 may be configured to, for example, divide the three-dimensional object-forming data retrieved by data input section 285 from computer device 310, to achieve conversion into a plurality of thin slice data items arranged in the stacking direction of object layers. The slice data items are object-forming data items of object layers for forming a three-dimensional object. The thickness of such a slice data item, namely, the thickness of an object layer matches the distance (stacking pitch) corresponding to the thickness of a single object layer.

Display section 270 may be, for example, a liquid crystal display or a monitor.

Operation section 275 may include pointing devices such as a keyboard and a mouse, and may include various operation keys such as a numeric key pad, an execution key, and a start key.

Storage section 280 may include various storage media such as ROM, RAM, magnetic disks, HDD, and SSD.

Three-dimensional object-forming apparatus 200 may include a decompression section (not shown) that decompresses the inside of the apparatus under control of control section 260, such as a decompression pump, or an inert gas supply section (not shown) that supplies an inert gas into the apparatus under control of control section 260.

Hereinafter, a three-dimensional object-forming method using three-dimensional object-forming apparatus 200 will be specifically described. Control section 260 divides the three-dimensional object-forming data retrieved by data input section 285 from computer device 310, to achieve conversion into a plurality of thin slice data items arranged in the stacking direction of object layers. Subsequently, control section 260 controls the following operations of three-dimensional object-forming apparatus 200.

Powder supply section 221 drives a motor and a driving mechanism (both are not shown) in accordance with the supply data outputted from control section 260, to move the supply piston upward in the vertical direction (direction represented by the left arrow in FIG. 1), to push out the powder material so as to be horizontally coplanar with the object-forming stage.

Subsequently, recoater driving section 222 moves, in the horizontal direction (direction represented by an arrow in the figure), recoater 222a in accordance with the thin layer-forming data outputted from control section 260, to convey the powder material to object-forming stage 210 and press the powder material such that the thin layer has a thickness corresponding to the thickness of a single object layer.

Preliminary heating section 230 heats the surface of the formed thin layer or the whole interior of the apparatus in accordance with the temperature data outputted from control section 260. Preliminary heating section 230 may start heating after formation of the thin layer, or may also heat, before formation of the thin layer, the area corresponding to the surface of the thin layer to be formed or the interior of the apparatus.

Subsequently, fluid-coating section 300 coats, in accordance with the fluid coating data outputted from control section 260, a region of the thin layer that constitutes a three-dimensional object in a slice data item, with the bonding fluid supplied from bonding fluid-coating section 301. On the other hand, a region of the thin layer that does not constitute the three-dimensional object is optionally coated with the release fluid supplied from release fluid-coating section 302.

Subsequently, infrared light irradiation section 240 irradiates, in accordance with infrared light irradiation data outputted from control section 260, the whole thin layer with infrared light. The irradiation with infrared light selectively causes a considerable increase in the temperature of the region coated with the bonding fluid, to fuse the thermoplastic resin included in the powder material. Thus, an object layer is formed.

Subsequently, stage support section 250 drives, in accordance with the position control data outputted from control section 260, a motor and a driving mechanism (both are not shown), to move object-forming stage 210, by the stacking pitch, downward in the vertical direction (direction represented by an arrow in the figure).

Display section 270 displays, as needed, under control of control section 260, various data and messages directed to the user. Operation section 275 receives various input operations from the user, and outputs operation signals corresponding to the input operations to control section 260. For example, a virtual three-dimensional object to be formed may be displayed on display section 270 and whether or not a desired shape is to be formed may be determined; when the desired shape is not going to be formed, modifications may be applied via operation section 275.

Control section 260, as needed, stores data into storage section 280 or retrieves data from storage section 280.

These operations are repeated to stack object layers, to produce a three-dimensional object.

EXAMPLES

Hereinafter, specific Examples according to the present invention will be described. Incidentally, these Examples do not limit the scope of the present invention.

1. Preparation of Raw Materials

Materials described in the following Table 1 were prepared. Incidentally, resin fine particles were pulverized by a mechanical pulverization process as needed such that the average particle sizes ($D_{50}$) measured with a laser-diffraction-type particle-size-distribution measurement apparatus equipped with a wet dispersion device (manufactured by SYMPATEC GmbH, HELOS) became the values described in Table 2. The surface tensions of the resins were determined by measuring surface tensions in the fused state using a pendant-drop-type interface tensiometer DSA25/DSA manufactured by KRUSS GmbH, and by extrapolating the surface tensions to surface tensions at 20° C.

2. Preparation of Powder Materials

Reference Example 1 and Comparative Examples 1 and 2

The above-described PA 12, PP, and PBT themselves were used as powder materials.

Comparative Example 3

PP particles (900 g) were placed into a tumbling fluidized bed coating machine (manufactured by Powrex Corporation, MP-10), and were fluidized under conditions of an air-supply temperature of 50° C., astatic pressure in the bed of 1.8 kPa, a discharge static pressure of 2.1 kPa, and a number of revolutions of the rotor of 400 rpm. Subsequently, a solution separately prepared by dissolving 100 g of PEHMA in 1000 parts by mass of tetrahydrofuran (THF) was introduced into the bed through a spray nozzle at a rate of 4 g/min, and the solution was sprayed through the spray nozzle to thereby provide a powder material having PEHMA layers (organic resin layers) around the PP particles (resin particles). Incidentally, at this time, regions corresponding to 99% of the surface area of the resin particles were covered by the organic resin layers. The percentage of being covered by the organic resin layers was determined in the following manner. A sectional image of a large number of object-forming particles was captured with a transmission electron microscope (TEM); 10 object-forming particles were randomly selected, and the surface areas of the resin particles and the areas covered by the organic resin layers were determined. Subsequently, the percentages of the particles being covered by the organic resin layers were calculated, and averaged to thereby achieve the determination.

Comparative Example 4 and Examples 1 to 3

The same procedures as in Comparative Example 3 were performed except that PEHMA was changed to the resins

TABLE 1

| | | Surface tension (mN/m) | mp(° C.) | Tg(° C.) | Trade name |
|---|---|---|---|---|---|
| POM | Polyoxymethylene | 44.6 | 165 | −60 | DURACON M90-44 manufactured by POLYPLASTICS CO., LTD. |
| PBT | Polybutylene terephthalate | 47.8 | 224 | 34 | TORAYMILL (registered trademark) PBT manufactured by Toray Industries, Inc. |
| PA6 | Polyamide 6 | 38.4 | 225 | 50 | Nylon 6 (TR-2) manufactured by Toray Industries, Inc |
| PA12 | Polyamide 12 | 35.8 | 178 | 50 | Nylon 12 (SP-10) manufactured by Toray Industries, Inc |
| PP | Polypropylene | 29.4 | 125 | 0 | PPW-5 manufactured by Seishin Enterprise Co., Ltd. |
| PC | Polycarbonate | 42.9 | | 145 | Iupilon S-3000 manufactured by MITSUBISHI GAS CHEMICAL COMPANY, INC. |
| PMMA | Polymethyl methacrylate | 41.1 | | 100 | ACRYPET MD001 manufactured by MITSUBISHI RAYON CO., LTD. |
| PAN | Polyacrylonitrile | 50 | | 104 | Zexlon (ZX) manufactured by Mitsui Chemicals, Inc. |
| PEHMA | Poly 2-ethylhexyl methacrylate | 28.8 | | −10 | manufactured by Sigma-Aldrich | described in Table 2 and the amount of addition was changed so as to correspond to the values described in Table 2, to obtain powder materials.

Examples 4 to 6

The same procedures were performed as in Comparative Example 3 except that the PP particles were replaced by PBT particles, PEHMA was changed to the resins described in Table 2, and the amount of addition was changed to the values in Table 2, to obtain powder materials.

3. Production of Three-Dimensional Objects

The powder materials produced in Reference Example 1, Examples 1 to 6, and Comparative Examples 1 to 4 above were each spread over an object-forming stage disposed on a hot plate to form a thin layer having a thickness of 0.1 mm, and preliminary heating at 160° C. was performed. In this thin layer, an ISO527-2-IBA test piece shape (maximum length: 75 mm, maximum width: 10 mm) was coated with a bonding fluid by an inkjet process. The bonding fluid employed included 15 parts by mass of triethylene glycol, 5 parts by mass of an infrared light absorbent (carbon black (manufactured by Cabot Corporation, Mogul-L)), and 80 parts by mass of water. The coating amount of the bonding fluid was set to be 30 µL per 1 mm. Subsequently, a region other than the region coated with the bonding fluid was coated with a release fluid by an inkjet process. The release fluid employed included 15 parts by mass of triethylene glycol and 85 parts by mass of water. The coating amount of the release fluid was set to be 30 µL per 1 mm. Subsequently, the thin layer was irradiated with infrared light from an infrared lamp, to heat the region coated with the bonding fluid so as to have a surface temperature of 220° C. Thus, the powder material in the region coated with the bonding fluid was fuse-bonded together, to form an object layer. These steps were repeated 10 times, to produce a three-dimensional object in which 10 object layers were stacked.

4. Evaluations

Each three-dimensional object was evaluated in terms of accuracy and strength in the following manner. The results are described in Table 2.

(Evaluation of Accuracy of Three-Dimensional Objects)

Each three-dimensional object was measured for sizes in the length direction using a digital caliper (manufactured by Mitutoyo Corporation, SUPER CALIPER CD67-S PS/PM, "SUPER CALIPER" is a registered trademark of the corporation). The differences between the design size (maximum length: 75 mm) and the sizes of the produced three-dimensional object were averaged, to determine the deviation of object-forming accuracy. At this time, evaluation was performed in accordance with the following grading system.

A: The error relative to the reference length of 75 mm is within ±0.05 mm (exclusive)

B: The error relative to the reference length of 75 mm is ±0.05 mm (inclusive) to ±0.15 mm (exclusive)

C: The error relative to the reference length of 75 mm is ±0.15 mm (inclusive) to ±0.3 mm (exclusive)

D: The error relative to the reference length of 75 mm is beyond ±0.3 mm (inclusive).

(Evaluation of Strength of Three-Dimensional Objects)

The three-dimensional objects produced by the above-described method and an injection molded product produced so as to have the same shape as in the three-dimensional objects were measured for tensile strength using a universal testing machine model-5582 manufactured by Instron under conditions of a tensile speed of 1 mm/min, a gripping distance of 60 mm, and a test temperature of 23° C. With reference to the strength of the injection molded product, the strengths of the obtained three-dimensional objects were evaluated in accordance with the following grading system.

A: 90 or more of the tensile strength of the injection molded product

B: 800 or more and less than 9000 of the tensile strength of the injection molded product D: Less than 80 of the tensile strength of the injection molded product

TABLE 2

| | Resin particles | | | | Organic resin layer | | | Evaluations | |
|---|---|---|---|---|---|---|---|---|---|
| | Resin species | Tg or melting point (° C.) | Average particle size $D_{50}$ (µm) | Surface tension (mN/m) | Resin species | Content (wt %) | Surface tension (mN/m) | Cover percentage (%) | Evaluation of strength | Evaluation of accuracy |
| Reference Example 1 | PA12 | — | 50 | 35.8 | — | | | | B | B |
| Comparative Example 1 | PP | — | 70 | 29.4 | — | | | | D | C |
| Comparative Example 2 | PBT | — | 60 | 47.8 | — | | | | D | D |
| Comparative Example 3 | PP | −10 | 71 | 29.4 | PEHMA | 10 | 28.8 | 99 | D | C |
| Comparative Example 4 | PP | 104 | 71 | 29.4 | PAN | 10 | 50 | 98 | D | D |
| Example 1 | PP | 178 | 51 | 29.4 | PA12 | 10 | 35.8 | 95 | B | B |
| Example 2 | PP | 145 | 51 | 29.4 | PC | 1 | 42.9 | 40 | B | B |
| Example 3 | PP | 165 | 53 | 29.4 | POM | 15 | 44.6 | 100 | B | B |
| Example 4 | PBT | 225 | 62 | 47.8 | PA6 | 12 | 38.4 | 100 | B | B |
| Example 5 | PBT | 100 | 61 | 47.8 | PMMA | 18 | 41.1 | 100 | B | B |
| Example 6 | PBT | 165 | 53 | 47.8 | POM | 15 | 44.6 | 100 | B | B |

As indicated in Table 2 above, the powder materials composed of resin particles alone did not have sufficiently high strength or dimensional accuracy (Comparative Examples 1 and 2). When the resin particles had an excessively low surface tension, the strength and dimensional accuracy were low (Comparative Example 1). In this case, the bonding fluid did not sufficiently spread, which inferentially resulted in unevenness of the concentration of the energy absorbent. As a result, the fusing state of the powder material became uneven, which inferentially resulted in the low strength. In addition, the unevenness of the concentration of the energy absorbent resulted in generation of weakly bonded portions, which inferentially affected dimensional stability.

On the other hand, also in the case where the resin constituting the resin particles had an excessively high surface tension, the strength and the dimensional accuracy were low (Comparative Example 2). This is inferentially caused because the bonding fluid used for coating excessively spread, so that the energy absorbent spread even to the non-curing region. In this case, since the energy absorbent spread even to the non-curing region, the amount of the energy absorbent in the curing region became insufficient, so that the resin particles in the curing region were not sufficiently fuse-bonded together, which inferentially resulted in the low strength.

By contrast, in the cases where organic resin layers including an organic resin having a surface tension of 30 mN/m to 45 mN/m were disposed around resin particles, irrespective of the species of the resin particles, the resultant three-dimensional objects had high strength and high accuracy (Examples 1 to 6). When the organic resin layers including such an organic resin are disposed, the spreading of the bonding fluid mainly depends on the wettability of the organic resin layers. When the organic resin layers are disposed, the bonding fluid can be evenly spread only in the desired region, so that the energy absorbent can be evenly distributed in the region. Thus, upon irradiation with energy, the fuse-bonding state of the resin particles was less uneven, which inferentially resulted in the high strength and the high object-forming accuracy of the three-dimensional object.

Incidentally, even in the cases where organic resin layers were disposed around the resin particles, when they had an excessively high or low surface tension (Comparative Examples 3 and 4), the resultant three-dimensional objects did not have sufficiently high dimensional accuracy or strength. Incidentally, in the case where the resin particles were composed of polyamide 12, since polyamide 12 itself has high wettability for the bonding fluid and the release fluid, good results were obtained without formation of the organic resin layers (Reference Example 1).

The present application claims a priority to Japanese Patent Application No. 2017-238751 filed Dec. 13, 2017. The entire contents described in the Description and drawings of this application are incorporated herein by reference.

INDUSTRIAL APPLICABILITY

The powder material according to the present invention has high wettability for aqueous solvents, and is applicable to a method for producing a three-dimensional object including coating with a bonding fluid and a release fluid. Thus, the present invention will inferentially contribute to a further increase in the prevalence of the three-dimensional object-forming method.

REFERENCE SIGNS LIST

200 Three-dimensional object-forming apparatus
210 Object-forming stage
220 Thin layer-forming section
221 Powder supply section
222 Recoater driving section
222a Recoater
230 Preliminary heating section
231 First heater
232 Second heater
235 Temperature measurement device
240 Infrared light irradiation section
250 Stage support section
260 Control section
270 Display section
275 Operation section
280 Storage section
285 Data input section
290 Base
300 Fluid-coating section
301 Bonding fluid-coating section
302 Release fluid-coating section
310 Computer device

The invention claimed is:

1. A powder material used for a method for producing a three-dimensional object, the method including forming a layer including the powder material, coating the layer with a bonding fluid including an aqueous solvent and an energy absorbent, and irradiating the layer with energy,
   the powder material comprising:
   an object-forming particle including
   a resin particle including a thermoplastic resin, and
   an organic resin layer disposed around the resin particle and including an organic resin having a surface tension of 30 mN/m to 45 mN/m,
   wherein a thickness of the organic resin layer is in a range of 15 to 500 nm, and an average diameter of the object-forming particle is in a range of 10 to 210 µm.

2. The powder material according to claim 1, wherein, in the object-forming particle, the organic resin layer covers 40% or more and 100% or less of a surface area of the resin particle.

3. The powder material according to claim 1, wherein the organic resin has a glass transition temperature or melting point of 100° C. or more and 230° C. or less.

4. A method for producing a three-dimensional object, the method comprising:
   forming a layer including the powder material according to claim 1;
   coating a specific region of the layer with a bonding fluid including an aqueous solvent and an energy absorbent; and
   irradiating, with energy, the layer after the coating to fuse the resin particle in the object-forming particle in the region coated with the bonding fluid to form an object layer.

5. The method for producing a three-dimensional object according to claim 4, wherein the forming, the coating, and the irradiating are repeated a plurality of times to stack the object layer, to form a three-dimensional object.

6. The method for producing a three-dimensional object according to claim 4, wherein, in the coating, a region adjacent to the region coated with the bonding fluid is coated with a release fluid that absorbs less energy than the bonding fluid.

7. The method for producing a three-dimensional object according to claim 6, wherein, in the coating, coating with the bonding fluid and the release fluid is performed by an inkjet process.

8. The method for producing a three-dimensional object according to claim 5, wherein the energy absorbent is an infrared absorbent, and, in the irradiating, irradiation with infrared light is performed.

9. The powder material according to claim 1, wherein the average diameter of the object-forming particle is in a range of 10 to 80 μm.

10. The powder material according to claim 1, wherein the surface tension of the organic resin is in a range of 30 mN/m to 40 mN/m.

11. The powder material according to claim 1, wherein components in the object-forming particles are insoluble in the aqueous solvent.

* * * * *